United States Patent [19]

Sato

[11] Patent Number: 4,474,339
[45] Date of Patent: Oct. 2, 1984

[54] FISHING REEL WITH ANTI-REVERSE-ROTATION CONTROL MECHANISM

[75] Inventor: Jun Sato, Sakai, Japan

[73] Assignee: Shimano Industrial Company Limited, Osaka, Japan

[21] Appl. No.: 360,984

[22] Filed: Mar. 23, 1982

[30] Foreign Application Priority Data

Mar. 28, 1981 [JP] Japan .................... 56-44321[U]

[51] Int. Cl.³ .......................................... A01K 89/02
[52] U.S. Cl. ............................ 242/84.1 R; 74/576; 74/577 S; 188/82.3
[58] Field of Search .............. 242/84.1 R, 84.21 R, 242/211, 212, 213, 214, 216, 217, 218, 219, 220, 221; 188/82.3, 82.4; 74/576, 577 S

[56] References Cited

U.S. PATENT DOCUMENTS

| | | | |
|---|---|---|---|
| 2,686,016 | 8/1954 | Kilian | 242/84.51 R X |
| 4,120,465 | 10/1978 | Noda | 242/219 X |
| 4,142,694 | 3/1979 | Rankin, Jr. | 242/220 X |
| 4,251,940 | 2/1981 | Henze et al. | 242/219 X |
| 4,281,808 | 8/1981 | Noda | 242/220 X |
| 4,340,189 | 7/1982 | Volkert et al. | 74/576 X |
| 4,341,366 | 7/1982 | Kawada | 242/220 |

Primary Examiner—Stuart S. Levy
Assistant Examiner—David Werner
Attorney, Agent, or Firm—Stevens, Davis, Miller & Mosher

[57] ABSTRACT

A fishing reel which has a spool journalled to a pair of side frames and a handle journalled to one side frame so that rotation of the handle is transmitted to the spool through a transmission mechanism including a master gear, the transmission mechanism incorporating therein an anti-reverse-rotation gear rotatable together with the master gear and an anti-reverse-rotation pawl engageable with the anti-reverse-rotation gear, the one side frame swingably supporting an operating member which operates the anti-reverse-rotation mechanism, a part of the operating member projecting outwardly from an opening formed at the one side frame.

3 Claims, 5 Drawing Figures

FISHING REEL WITH ANTI-REVERSE-ROTATION CONTROL MECHANISM

FIELD OF THE INVENTION

This invention relates to a fishing reel, and more particularly to a fishing reel which has a spool having a spool shaft journalled to a pair of side frames and a handle journalled to one side frame so that rotation of the handle is transmitted to the spool through a transmitting mechanism including a master gear.

BACKGROUND OF THE INVENTION

Generally, this kind of fishing reel is provided with a handle and a transmission mechanism which transmits a driving force from the handle to a spool, the handle being rotated to drive the spool through the transmitting mechanism and wind a fishing line onto the spool, the transmission mechanism including a clutch means which disengages to make the spool freely rotatable, thereby permitting the line to be drawn therefrom for casting.

The reel is provided at the transmitting mechaniam with an anti-reverse-rotation gear and an anti-reverse-rotation pawl so that the pawl engages with the gear to prevent the reverse rotation of the handle and is operable from outside the side frame to engage with or disengage from the gear.

In other words, a separate operating member, which comprises an operating portion projecting outwardly from the side frame and a biasing member for biasing the anti-reverse-rotation pawl within the side frame, is mounted thereon slidably through a leaf spring, and a projection is provided within the side frame to restrict a range of sliding motion of the operating member.

This construction, however, is complicated in the manner of mounting the operating member onto the side frame, requires a large space within the side frame for housing therein the operating member, and is difficult to ensure from outside the reel the engagement of the operating member with the anti-reverse-rotation pawl.

SUMMARY OF THE INVENTION

In the light of the above problem, this invention has been designed. An object of the invention is to provide a fishing reel provided with an operating member for the anti-reverse-rotation mechanism, which operating member is simple in construction, smaller in an occupied area, and easy to ensure an operating condition of the operating member from outside the reel.

In detail, a fishing reel of the invention incorporates in the transmitting mechanism an anti-reverse-rotation mechanism comprising an anti-reverse-rotation gear rotatable together with a master gear at the tramsmission mechanism and an anti-reverse-rotation pawl supported swingably to the side frame and engageable with the anti-reverse-rotation gear, and includes an operating member pivoted to the side frame and engageable with the pawl to restrict its engagement with or disengagement from the gear, the operating member partially projecting outwardly from the side frame through an opening formed thereon, so that the projection is biased to engage the pawl with the gear for preventing the reverse rotation of the handle.

Also, a space within the side frame occupied by the operating member is small enough to allow the swinging motion thereof. Furthermore, a quick determination can be made by an angler on the operation of anti-reverse-rotation mechanism by an observation of the state of the operating member projecting outwardly from the side frame.

These and other objects, features and advantages of the invention will become more apparent upon a reading of the following detailed specification and drawings, in which,

DETAILED DESCRIPTION OF THE INVENTION

Figure 1:
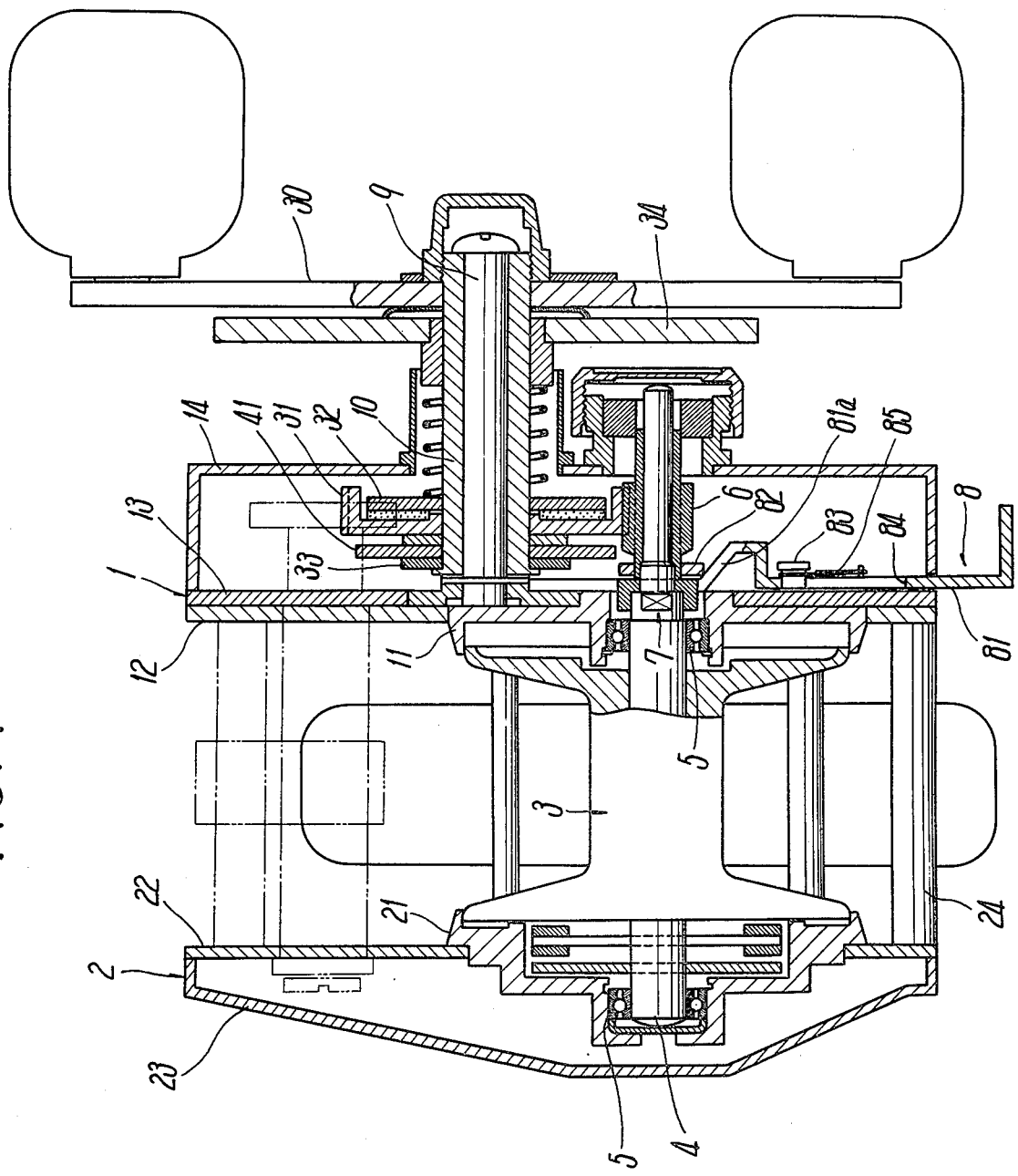
FIG. 1 is a longitudinally sectional view of an embodiment of a fishing reel of the invention.

Referring to the drawing, a fishing reel of a right-hand handle type is shown, having a construction which is basically well known. It has a spool 3 having a spool shaft 4 supported rotatably through bearings 5 to first and second side frames 1 and 2 opposite to each other at a regular interval, a handle provided at the first side frame 1, a transmission mechanism including a master gear for transmitting rotation of the handle to the spool 3, and a clutch control mechanism operable so that a clutch means thereof engages and the handle is operated to rotate the spool 3 and wind a fishing line thereon and the clutch means disengages to allow the spool 3 to freely rotate.

The first side frame 1 comprises a side plate 12 having at the center a bearing housing 11, an affix plate 13 affixed to the outside of side plate 12, and a cover 14 attached to the outside thereof. The second side frame 2 comprises a side plate 22 having at the center a bearing housing 21 and a cover 23 attached to the outside of the side plate 22, both the side frames 1 and 2 being connected at a fixed interval by a plurality of connecting rods 24, and the bearing housings 11 and 21 carrying the bearings 5 to rotatably support the spool shaft 4.

The spool shaft 4 axially extends to enter the first side frame 1 and carries a pinion 6 at the projecting end in relation of being rotatable and axially movable. A clutch means 7 is provided between the pinion 6 and the spool shaft 4 and engages or disengages through a clutch lever 81 at a clutch mechanism 8.

A handle shaft 10 is journalled to the affixed plate 13 and cover 14 through a support shaft 9, projects at one axial end outwardly from the cover 14 to fix a handle 30 at the projection, and supports at the other axial end a master gear 31, a friction plate 32, and a return plate 33 having a gear 33a fixed to the outer periphery thereof.

The friction plate 32 and return plate 33 are inserted onto the handle shaft 10 rotatably not relative to but together therewith, the master gear 31 being inserted freely onto the handle shaft 10 to transmit a rotating force from the handle shaft 10 to the master gear 31 through the friction plate 32.

The biasing force of friction plate 32 against the master gear 31 is adjustable by an adjuster 34 screwable with one axial end of handle shaft 10.

The handle shaft 10, master gear 31, friction plate 32 and pinion 6, constitute a transmission mechanism for transmitting the rotation of handle 30 to the spool 3 through the spool shaft 4.

The clutch means 7 comprises flat faces provided at an intermediate portion of spool shaft 4 and a tubular portion provided at the pinion 6 and having a not-round inner surface engageable with the flat faces, so that the clutch lever 81 at the clutch control mechanism 8 is operated to disengage the tubular portion from the flat faces so as to allow the spool shaft 4 and spool 3 to freely rotate.

The clutch control mechanism 8 comprises a clutch yoke 82 carrying the pinion 6 to bias it in the direction of engaging the clutch means 7, a forked clutch lever 81 having a biasing portion 81a for biasing the clutch yoke 82, and the return plate 33, the clutch lever 81 being supported to the affixed plate 13 in relation of being movable in reciprocation perpendicularly to the spool shaft 4 through a pin 83 and an elongate slot 84. The clutch lever 81 is biased to the end position of its forward movement and the end position of its backward movement by use of a torsion spring 85 and moves forwardly to move the pinion 6 through the clutch yoke 82 in the direction of disengaging the clutch means and backwardly to move the pinion 6 through the clutch yoke 82 in the direction of engaging the clutch means 7.

Figure 2:
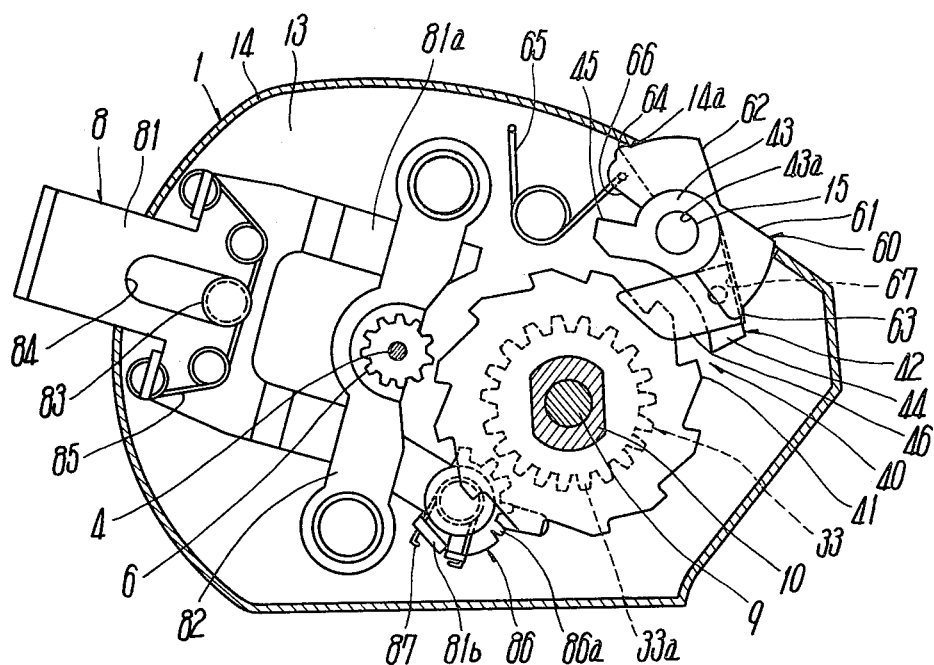
FIG. 2 is a partially cutaway right-side view of the FIG. 1 embodiment.
Figure 3:
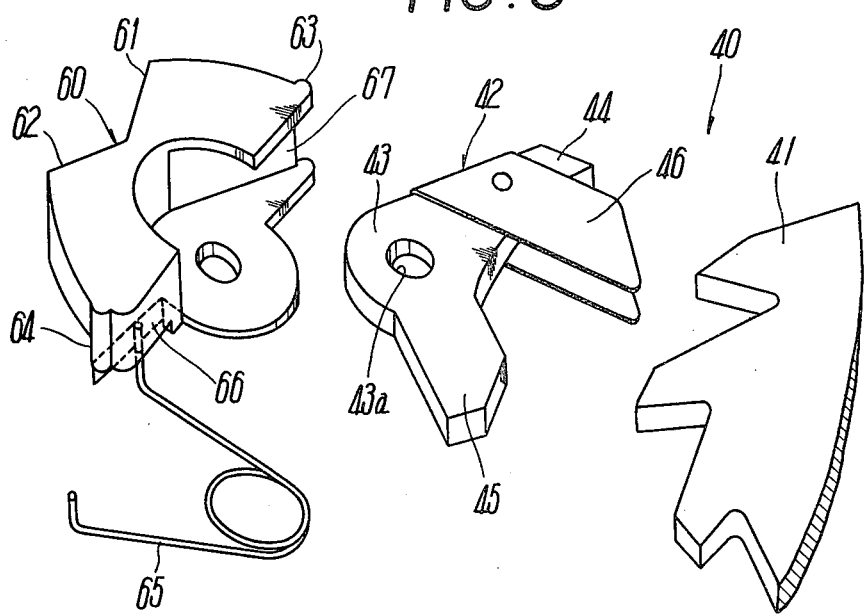
FIG. 3 is a perspective exploded view of an anti-reverse-rotation mechanism and an operating member.
Figure 4:
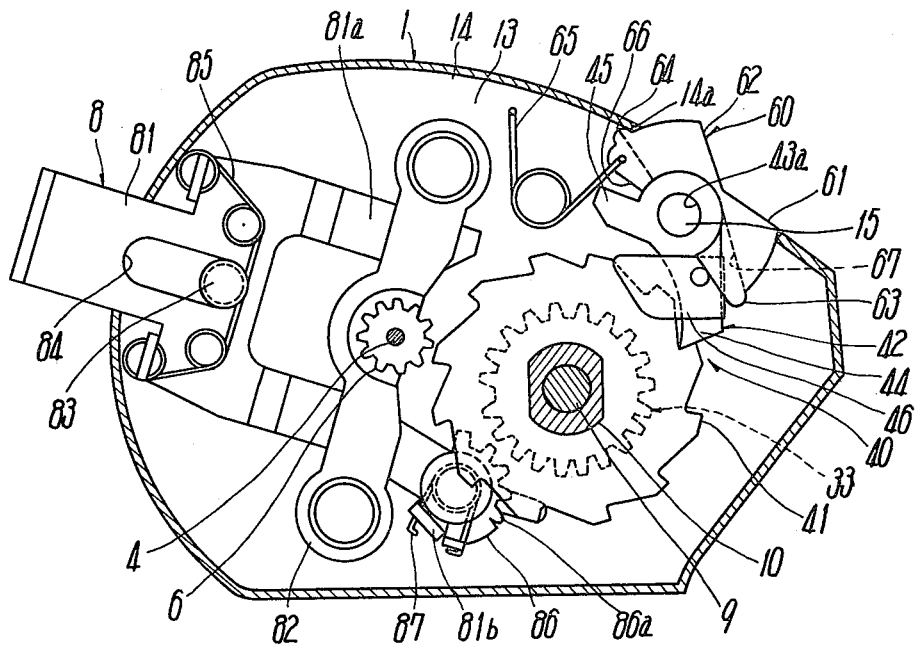
FIGS. 4 and 5 are partially cutaway right-side views of the anti-reverse-rotation mechanism in an operating condition.

At the foremost end of clutch lever 81 is pivotally supported an engaging member 86 rotatable at a given angle and having teeth 86a engageable with the gear 33a at the return plate 33, and a coil spring 87 is interposed between the engaging member 86 and the clutch lever 81 so as to bias the engaging member 86 counterclockwise in FIG. 2.

When the engaging member 86 engages with the gear 33a following the movement of clutch lever 81 and rotates counterclockwise in FIG. 2, the torsion spring 85 simultaneously inversely acts on the clutch lever 81 and holds it at the end position of the forward movement thereof. The handle 30 is operated to rotate the return plate 33 when the clutch lever 81 is positioned at the end position of the forward movement thereof, then the engaging member 86 contacts a stopper 81b provided at the clutch lever 81 and stops its further rotation, so that the rotating force of the return plate 33 is transmitted to the clutch lever 81, whereby the lever 81 moves backwardly and is held at the end position of its backward movement through the inversed torsion spring 85.

The fishing reel of the invention constructed as foregoing is provided with an anti-reverse-rotation mechanism 40 which restrains the handle 30 from reversely rotating and with an operating member 60 for operating the anti-reverse-rotation mechanism 40.

The anti-reverse-rotation mechanism 40 comprises an anti-reverse-rotation gear 41 rotatable together with the master gear 31 and an anti-reverse-rotation pawl 42 engageable with the gear 41. The anti-reverse-rotation gear 41 is inserted onto the handle shaft 10 rotatably not-relative to but together therewith, a pin 15 is provided at the affixed plate 13 and pivotally supports the anti-reverse-rotation pawl 42 and operating member 60 in relation of being swingable independently of each other.

The anti-reverse-rotational pawl 42 comprises a boss 43 having an insertion bore 43a for the pivot pin 15, a pawl body 44 engageable with the anti-reverse-rotation gear 41, and an engaging nose 45 engageable with a control face to be discussed below at the operating member 60, the pawl body 44 having a contact member 46 comprising a leaf spring of a U-like shape in section so that the contact member 46 elastically nips the anti-reverse-rotation gear 41, thereby allowing the anti-reverse-rotation pawl 42 to swing following the rotation of anti-reverse-rotation gear 41.

The operating member 60 has first and second control portions 61 and 62, which project outwardly from the cover 14 through an opening 14a provided thereat, and is provided at both ends with a pair of projections 63 and 64 each engageable with the inside of the edge of opening 14a, by which a range of swinging motion of operating member 60 is restricted to the positions where the anti-reverse-rotation pawl 42 engages with and disengages from the anti-reverse-rotation gear 41. A bias member 65 formed as a torsion spring is interposed between the operating member 60 and the affixed plate 13 and changed-over in the direction of action so as to bias the operating member 60 toward the position where the pawl 42 engages with or disengages from the gear 41.

The operating member 60 is provided at the opposite end faces to the control portions 61 and 62 with a control face 66 engageable with the nose 45 and a recess 67 for receiving the boss 43 of anti-reverse-rotation pawl 42.

In this construction, the first control portion 61 at the operating member 60 is pushed to position the operating member 60 as shown in FIG. 2 and the handle 30 is rotated clockwise in FIG. 2, i.e., in the direction of winding up the line, so that the anti-reverse-rotation gear 41 rotates a counter-clockwise to give the contact member 46 the clockwise moment, whereby the pawl 42 swings counterclockwise around the pivot pin 15 and leaves the gear 41. Hence, the anti-reverse-rotation pawl 42 disengages from the gear 41 so that the handle 30 is rotatable without interference from pawl 42.

When the handle 30 is rotated counterclockwise in FIG. 2, the anti-reverse-rotation gear 41 rotates counterclockwise to give the contact member 46 a clockwise moment to rotate clockwise the anti-reverse-rotation pawl 42, whereby the pawl 42 engages with the gear 41, thus preventing the reverse rotation of handle 30.

Figure 5:
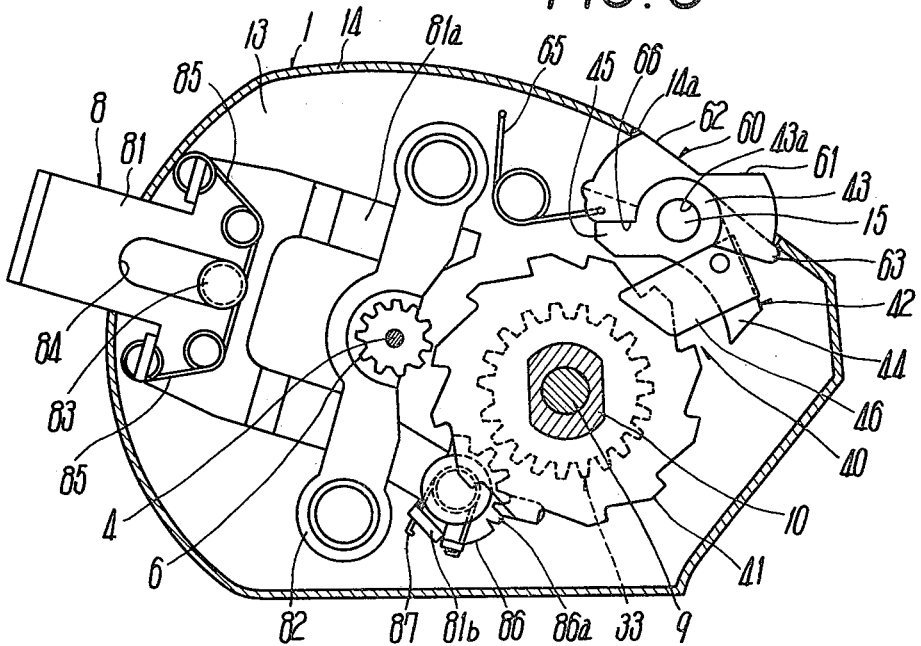

On the other hand, when the second control portion 62 is pushed to position the operating member 60 as shown in FIG. 5, the nose 45 is pushed by the control face 66 so that the pawl 42 swings counterclockwise in FIG. 5 to be kept disengaged from the gear 41. In such condition, even when the handle 30 is rotated clockwise and vice versa in FIG. 5, the pawl 42 is held as shown, thereby not engaging with the gear 41. Hence, the handle is rotatable freely normally or reversely.

As seen from the above, the fishing reel of the invention uses the pivot pin 15 for pivoting the operating member 60 as well as the anti-reverse-rotation pawl 42, thereby being simple in construction, reducing the number of parts, and facilitating manufacture.

Also, the first side frame 1 need only have a small space in which the operating member 60 is swingable.

Furthermore, an angler may glance at the condition of control portions 61 and 62 of operating member 60 to quickly determine whether or not the handle 30 is restrained from the reverse rotation.

While a preferred embodiment of the invention has been described using specific terms, such description is for illustrative purpose only, and it is to be understood that changes and variations may be made without departing from the spirit or scope of the invention which is defined in the following claims.

What is claimed is:

1. A fishing reel comprising first and second side frames, a cover covering said first side frame, a spool mounted between said side frames, a handle journalled to said first side frame, at ransmission mechanism transmitting rotation of said handle to said spool and including a master gear, an anti-reverse-rotation mechanism for restraining said handle from being reversely rotated, an operating member partially projecting through an opening in said cover and supported swingably to said first side frame for operating said anti-reverse-rotation mechanism and a biassing member for biassing said operating member to each of two operating positions, said operating member including an outer surface portion having first and second control portions which are operator manipulatible and a pair of projections mounted inside said cover and engageable with a peripheral edge of said opening to restrict said operating member so that it moves between said two operating positions, said anti-reverse-rotation mechanism comprising an anti-reverse-rotation gear rotatable together with said master gear and an anti-reverse-rotation pawl supported swingably to said first side frame and engageable with said anti-reverse-rotation gear, said operating member having a control face which engages with said anti-reverse-rotation pawl to control engagement and disengagement of said pawl with and from said anti-reverse-rotation gear depending on whether said operating member is in one or the other of said two operating positions, said anti-reverse-rotation pawl and operating member being supported independently swingably to one pivot pin.

2. A fishing reel according to claim 1, wherein said anti-reverse-rotation pawl has a contact member which elastically nips the anti-reverse-rotation gear so that said pawl swings following the reverse rotation of said anti-reverse-rotation gear to engage therewith and an engaging nose which engages with said control face at said control member to thereby prevent said anti-reverse-rotation pawl from swinging following the reverse rotation of said anti-reverse-rotation gear.

3. A fishing reel according to claim 1, wherein said anti-reverse-rotation pawl has a boss, said operating member having a recess for receiving therein said boss.

* * * * *